(12) United States Patent
Parish et al.

(10) Patent No.: US 11,466,793 B1
(45) Date of Patent: Oct. 11, 2022

(54) PRESSURE COMPENSATED BELLOWS VALVE

(71) Applicant: Flowserve Management Company, Irving, TX (US)

(72) Inventors: Paul Jeffrey Parish, Spanish Fork, UT (US); Michael P. Nelson, Lehi, UT (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 17/485,663

(22) Filed: Sep. 27, 2021

(51) Int. Cl.
| | |
|---|---|
| *F16K 41/10* | (2006.01) |
| *F16K 5/04* | (2006.01) |
| *F16K 31/126* | (2006.01) |
| *F16K 1/38* | (2006.01) |

(52) U.S. Cl.
CPC .............. *F16K 41/10* (2013.01); *F16K 5/04* (2013.01); *F16K 41/103* (2013.01); *F16K 41/106* (2013.01); *F16K 1/38* (2013.01); *F16K 31/1266* (2013.01)

(58) Field of Classification Search
CPC ...... F16K 41/10; F16K 41/103; F16K 41/106; F16K 5/04
USPC ....................................................... 251/335.1
See application file for complete search history.

(56) References Cited

U.S. PATENT DOCUMENTS

| | | | | | |
|---|---|---|---|---|---|
| 1,360,833 | A | * | 11/1920 | Vuilleumier | F16K 41/10 251/278 |
| 1,374,571 | A | * | 4/1921 | Hummel | F16K 41/10 251/278 |
| 1,779,503 | A | * | 10/1930 | Swindin | F16K 41/10 74/18.2 |
| 2,239,169 | A | * | 4/1941 | Franck | F16K 17/16 251/335.1 |
| 2,691,773 | A | * | 10/1954 | Lichtenberger | F16K 41/10 137/557 |
| 2,693,822 | A | * | 11/1954 | Gerow | F16K 41/10 137/315.07 |
| 3,110,319 | A | * | 11/1963 | Arata | F16K 51/02 137/340 |
| 3,399,695 | A | * | 9/1968 | Stehlin | F16K 41/103 137/551 |
| 5,000,215 | A | * | 3/1991 | Phillips | F16K 41/103 264/339 |
| 6,305,665 | B1 | * | 10/2001 | Coura | F16K 41/103 251/319 |
| 9,695,948 | B2 | * | 7/2017 | Kienreich | F16K 1/02 |

(Continued)

*Primary Examiner* — Umashankar Venkatesan
(74) *Attorney, Agent, or Firm* — Maine Cernota & Rardin (57) ABSTRACT

A bellows seal valve includes a pressurization port that can be used to apply a compensating pressure to the "atmosphere" side of the bellows, i.e. the side of the bellows that is opposite to the process fluid. The atmosphere side can be on the interior or exterior of the bellows. The compensating pressure can be greater than the process fluid pressure, to ensure that any leakage will be of pressurizing fluid into the process fluid or into the environment, and that no process fluid will escape into the environment. The pressure or flow rate of the pressurizing fluid can be monitored to detect bellows and packing leaks. A pressurizing fluid exit port can be provided, so that the pressurizing fluid can be circulated through the valve, thereby moderating the bellows temperature under conditions of extreme process fluid temperature.

13 Claims, 5 Drawing Sheets

(56) References Cited

U.S. PATENT DOCUMENTS

| | | | |
|---|---|---|---|
| 2004/0051073 A1* | 3/2004 | Estrems | F16K 15/1823 251/335.3 |
| 2013/0008252 A1* | 1/2013 | Ott | F16K 37/0075 73/587 |
| 2018/0119837 A1* | 5/2018 | McKoon | F16K 1/54 |
| 2020/0109795 A1* | 4/2020 | Murray | F16K 1/126 |

* cited by examiner

PRESSURE COMPENSATED BELLOWS VALVE

STATEMENT OF GOVERNMENT INTEREST

Portions of the present invention may have been made in conjunction with Government funding under contract number DE-NA0003525, and there may be certain rights to the Government.

FIELD OF THE INVENTION

The invention relates to valves, and more particularly, to bellows seal valves.

BACKGROUND OF THE INVENTION

For critical valve applications where even the smallest amount of external valve leakage is not acceptable, a bellows seal valve is typically used.

Figure 1:
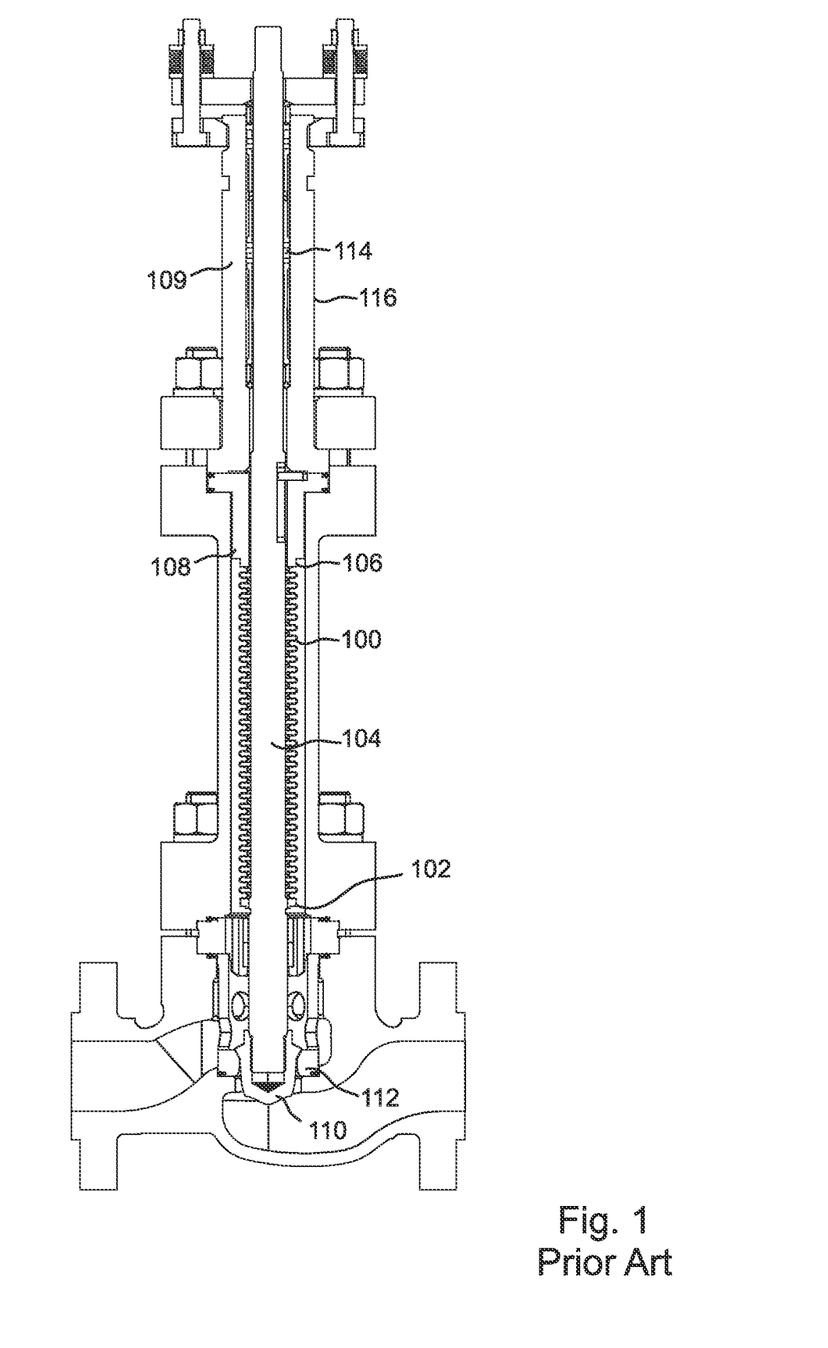
FIG. 1 is a sectional view of a bellows valve of the prior art.

With reference to the sectional diagram of FIG. 1, a bellows seal valve comprises an accordion-like bellows 100. One end 102 of the bellows 100 is welded or attached to the valve stem 104. The other end 106 of the bellows 100 is welded to a part 108 that can be clamped or otherwise attached to the valve bonnet 109. When operating the valve, the valve stem 104 is moved in a linear valve stroke so as to control the position of a valve plug 110 relative to a valve seat 112. During the valve stroke, the bellows 100 compresses or expands along with the linear motion of the sliding valve stem 104.

Since the bellows 100 has a static seal at each end 102, 106, and the circumference of the valve stem 104 is covered by the bellows 100, a metal barrier between the process fluid inside of the valve and the external atmosphere is provided, eliminating leakage at the valve stem 104. In the example of FIG. 1, the process fluid is outside of the bellows 100, and the atmosphere is inside of the bellows 100. For other bellows valves, the process fluid is inside of the bellows 100 and the atmosphere is outside of the bellows 100.

Because the metal bellows 100 is flexed as the valve stem 104 is moved, over time the bellows 100 will ultimately crack and fail. To prevent leakage due to a bellows failure, a set of packing 114 is provided above the bellows 100 to provide a second seal.

If the bellows 100 were to develop a leak path, the process fluid in the example of FIG. 1 would leak from the outside of the surface of the bellows 100, through the leak path, into the inside area of the bellows 100. The valve fluid would then be sealed from the outside environment only by the valve stem packing 114 in the gland area 116 of the valve. If the valve stem packing 114 were to leak, then the process fluid would escape to the outside atmosphere. Since valve stem packing 114 typically allows a higher level of leakage than a bellows 100, there is a high probability that if the bellows 100 were to developed a leak path, at least some process fluid would escape through the bellows 100 and valve stem packing 114 to the outside environment.

Accordingly, it is important to periodically replace a bellows valve, or at least to replace the bellows 100 of the valve, so as to avoid the possibility of any process fluid leaking into the environment. However, these replacements can be inconvenient and expensive.

What is needed, therefore, is a bellows valve design that has an extended cycle life, while reducing the likelihood of any release of process fluid into the environment if a leak path through the bellows should occur.

SUMMARY OF THE INVENTION

The present invention is a bellows valve design that has an extended cycle life, while reducing the likelihood of any release of process fluid into the environment if a leak path through the bellows should occur.

One of the important factors that affects the cycle life of a bellows seal valve is the pressure differential between the external and internal surfaces of the bellows that arises due to a process fluid pressure that is higher than the ambient pressure. Stresses in the convolutions of a bellows are higher when the pressure differential is higher, and these higher stresses tend to reduce the cycle life of the bellows.

According to the present invention, the bellows valve includes a bellows pressurization port that can be used to pressurize the "atmosphere" side of the bellows so as to offset the pressure that is applied by the process fluid to the "process fluid" side of the bellows, thereby reducing or eliminating the pressure differential that is applied to the bellows. Much of the following discussion assumes that the process fluid applies pressure to the external side of the bellows, and that the interior of the bellows is pressurized. However, one of skill in the art will be easily able to adapt the principles of the present invention to a bellows valve in which the process fluid occupies the interior of the bellows, and the exterior side of the bellows is pressurized. It should therefore be understood that all references herein to pressurizing the interior of the bellows refer in general to pressurizing the "atmosphere" side of the bellows, which can be the interior or exterior side of the bellows.

Pressurizing the bellows with a pressurizing fluid, such as nitrogen, so as to reduce the pressure differential provides several advantages over prior art approaches. First, by reducing the stress that is applied to the bellows due to a pressure differential, the cycle lifetime of the bellows valve is extended.

Second, by reducing the forces to which the bellows is subjected, it becomes possible to use a thinner bellows, and/or a bellows with fewer plies, thereby reducing the cost of the valve.

Third, by applying the pressurizing fluid at a slightly higher pressure than the process fluid pressure, the present invention ensures that if a bellows leak should occur, any leakage that results will be a slow leakage of the pressuring fluid into the process fluid and/or into the environment, thereby virtually eliminating any possibility that process fluid could escape into the environment.

Furthermore, by monitoring the pressure and/or flow rate of the pressurizing fluid, any leakage through the bellows and/or through the packing is easily detected.

In some embodiments where the process fluid can reach either a very high temperature or a very low temperature, the invention further comprises a pressurizing fluid exit port, thereby allowing the pressurizing fluid to be circulated from the bellows pressurization port to the pressurizing fluid exit port. The pressurizing fluid can then be used as a heating or cooling medium, so as to avoid subjecting the bellows to the extreme temperatures of the process fluid. Furthermore, heating and circulating the pressurizing fluid can assist with freeze recovery of the valve if the process fluid solidifies due to extreme low temperatures.

One general aspect of the present invention is a bellows valve system that includes a bellows valve. The bellows valve includes a valve seat, a valve plug configured to control a flow of process fluid through the bellows valve according to a separation between the valve plug and the valve seat, a valve stem in mechanical communication with the valve plug and configured such that linear actuation of the valve stem controls the separation between the valve plug and the valve seat, a bellows housing surrounding a bellows portion of the valve stem, a bellows surrounding the bellows portion of the valve stem within the bellows housing, a proximal end of the bellows being fixed and sealed to the bellows housing, a distal end of the bellows being fixed and sealed to the valve stem, such that the bellows is compressed and extended as the valve stem is actuated, the bellows being configured such that the process fluid contacts a first surface of the bellows but is prevented by the bellows from reaching a second surface of the bellows, and a bellows pressurization port configured to allow a bellows pressurizing fluid to enter into the bellows valve and to apply a compensating pressure to the second surface of the bellows.

In embodiments, the first surface of the bellows is an exterior surface of the bellows, and the second surface of the bellows is an interior surface of the bellows.

Any of the above embodiments can further include a pressurization fluid source, a pressurizing fluid pressure regulating apparatus, and a pressurization fluid line that provides fluid communication between the pressurization fluid source and the bellows pressurization port of the bellows valve. Some of these embodiments further include a pressure measuring device configured to measure a pressure of the pressurizing fluid as it enters the bellow valve. Any of these embodiments can further include a flow measuring device configured to measure a flow rate of the pressurizing fluid as it enters the bellow valve.

In any of the above embodiments, the bellows valve can further include a pressurizing fluid exit port configured so as to enable the pressuring fluid to be circulated from the bellows pressurization port to the pressurizing fluid exit port.

Another general aspect of the present invention is a method of increasing a cycle life of a bellows valve. The method includes providing a bellows valve system according to the first general aspect, estimating a process pressure applied by the process fluid to the first surface of the bellows valve, and applying a pressurizing fluid to the pressurization port, the pressurizing fluid being thereby applied to the second surface of the bellows, such that a differential pressure applied to the bellows is reduced.

In embodiments, the pressurizing fluid is applied to the pressurizing port at a pressure that is higher than the estimated process pressure.

Any of the above embodiments can further include monitoring at least one of a pressure of the pressuring fluid and a flow rate of the pressurizing fluid.

In any of the above embodiments, if the monitored pressure or the monitored flow rate changes by more than a specified amount, the method can further include determining that a leak has developed in the bellows valve, and taking an action that eliminates the leak.

In any of the above embodiments, the bellows valve can further include a pressurizing fluid exit port in fluid communication within the bellows valve with the bellows pressurization port. In some of these embodiments the method further comprises circulating the pressurizing fluid through the bellows valve from the bellows pressurization port to the pressurizing fluid exit port. And in some of these embodiments the method further comprises heating or cooling the pressurizing fluid before it enters the pressurization port.

And in any of the above embodiments, the pressurizing fluid can be nitrogen gas.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a bellows valve design that has an extended cycle life, while reducing the likelihood of any release of process fluid into the environment if a leak path through the bellows should occur.

Figure 2:
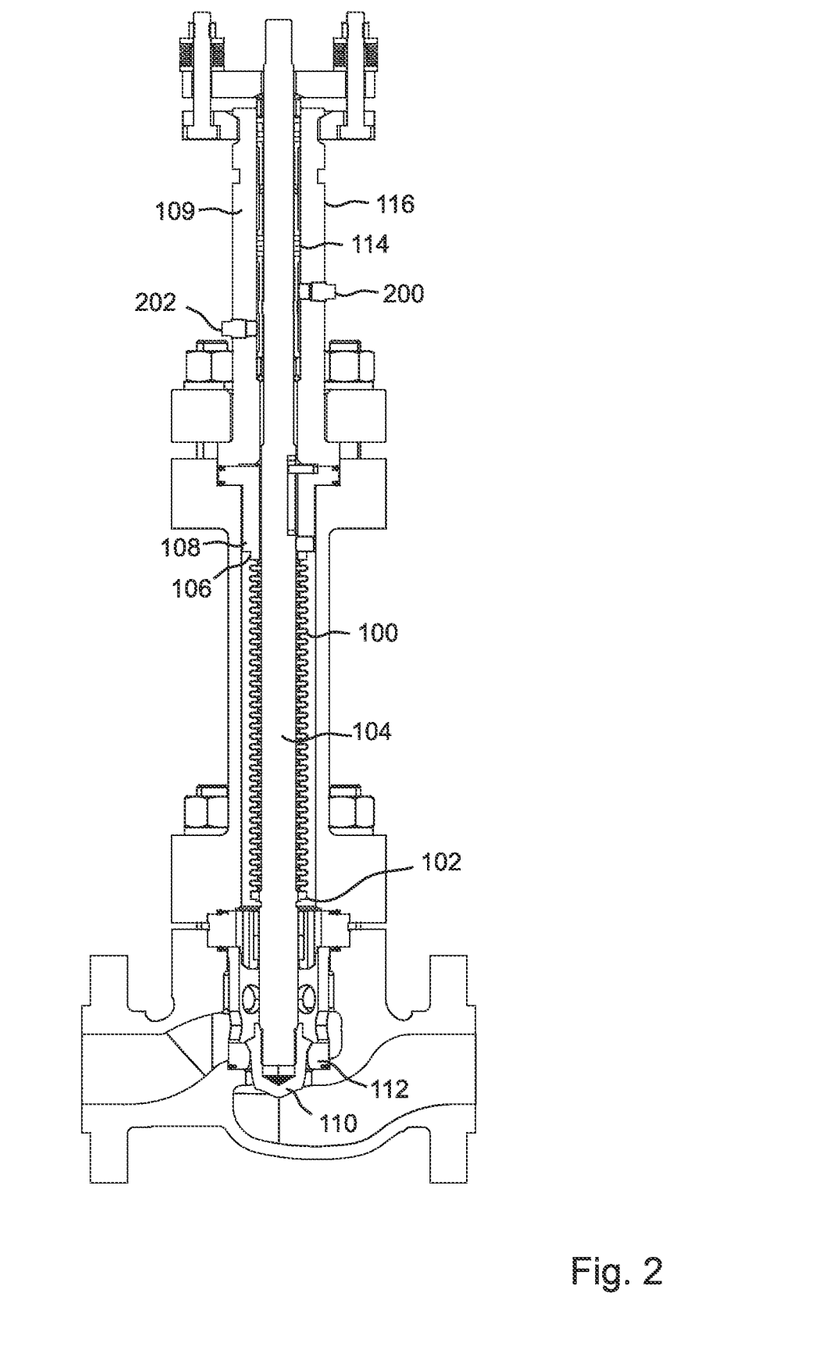
FIG. 2 is a sectional view drawn to scale of an embodiment of the present invention.

With reference to FIG. 2, the bellows valve of the present invention includes a bellows pressurization port 200 that can be used to pressurize the "atmosphere" side of the bellows so as to approximate the pressure that is applied to the bellows by the process fluid on the "process fluid" side of the bellows. The pressure differential that is applied to the bellows 100 is thereby minimized or eliminated.

In the embodiment of FIG. 2, the process fluid applies pressure to the external side of the bellows, while the interior of the bellows is pressurized via the pressurization port 200. However, one of skill in the art can easily adapt the principles of the present invention to a bellows valve in which the process fluid occupies the interior of the bellows, and the exterior side of the bellows is pressurized. It should therefore be understood that all references herein to pressurizing the interior of the bellows refer in general to pressurizing the "atmosphere" side of the bellows, which can be the interior or exterior.

Figure 3:
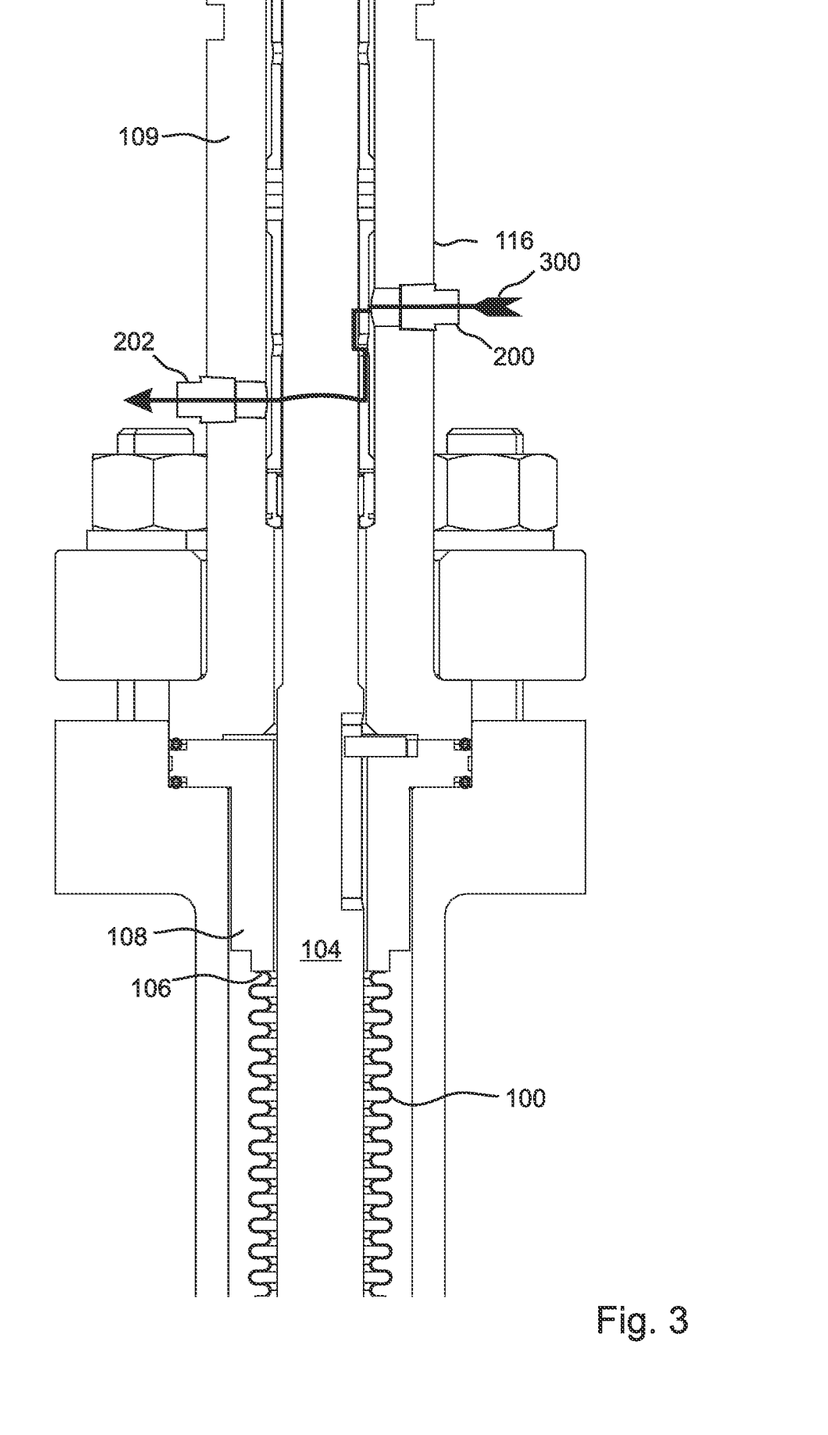
FIG. 3 is close-up sectional view drawn to scale of a portion of the valve of FIG. 2, showing the path of the pressurization fluid as it circulates from the pressurization port to the pressurization fluid exit port.

With reference to FIG. 3, there is only a small gap between the valve stem 104, which moves up and down when the valve is operated, and the surrounding bellows 100 and other structures. Nevertheless, the gap is sufficient to allow a pressurizing fluid, such as nitrogen gas, to enter through the pressurization port 200 and find its way to the interior (atmosphere) side of the bellows 100, so that the pressure differential between the inner and outer walls of the bellows 100 is minimized.

Pressurizing the bellows with a pressurizing fluid so as to reduce the pressure differential provides several advantages over prior art approaches. First, by reducing the stress that is applied to the bellows 100 due to a pressure differential, the cycle lifetime of the bellows valve is extended.

Second, by reducing the forces to which the bellows 100 is subjected, it becomes possible to use a thinner bellows 100, or a bellows 100 with fewer plies, thereby reducing the cost of the valve.

Third, by applying the pressurizing fluid at a slightly higher pressure than the process fluid pressure, the present invention ensures that if a bellows leak should occur, any leakage that results will be a slow leakage of the pressuring fluid into the process fluid or into the environment, thereby virtually eliminating any possibility that process fluid could escape into the environment.

Furthermore, by monitoring the pressure and/or flow rate of the pressurizing fluid, any leakage through the bellows and/or through the packing can be easily detected.

Embodiments further comprise a pressurizing fluid exit port 202. With reference to FIG. 3, this allows the pressurizing fluid to be circulated 300 from the bellows pressurization port 200 to the pressurizing fluid exit port 202.

Figure 4:
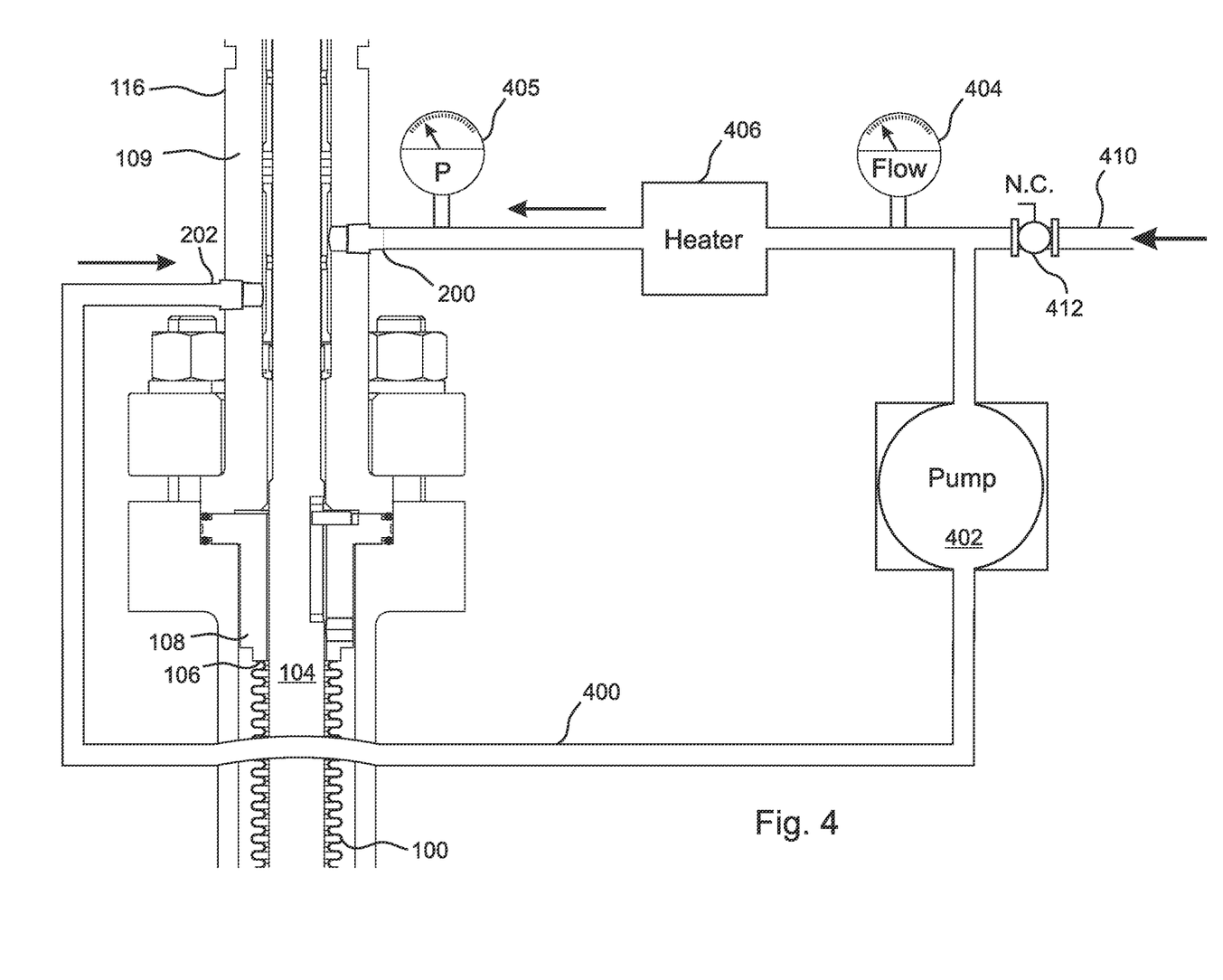
FIG. 4 is a sectional side view of the valve of FIG. 3 connected to a pressurization fluid circulation system comprising a pump, a flow gage, and a heater.

In the embodiment of FIG. 4, the pressurizing fluid is circulated by a pump 402 through a pressure line 400 from the bellows pressurizing input port 200 to the pressurizing fluid exit port 202. A flow gage 404 is used to monitor the rate of flow of the pressurizing fluid, and a pressure gage 405 is used to monitor the pressure of the pressurizing fluid as it enters the bellows pressurization port 200. The pressurizing fluid can be introduced into the system, and replenished if need be, by applying additional pressurizing fluid to a pressurizing fluid inlet 410 and opening a normally closed (N.C.) valve 412. Assuming that the pump 402 maintains the pressurizing fluid at a constant pressure as it enters the valve the flow rate should remain constant. Therefore, any increase of the flow rate and/or decrease in the pressure will indicate that there is a leakage path, either through the bellows 100 or past the packing 114. While a mechanical flow gage 404 and a mechanical pressure gage 405 are symbolically shown in FIG. 4, in other embodiments one or both of the flow gage 404 and the pressure gage 405 is an electronic gage that reports the measured flow or pressure of the bellows pressurizing fluid to a controller and/or to an alarm system configured to alert support personnel if the flow rate increases beyond a specified limit and/or if the pressure decreases below a specified limit.

Circulating the pressurizing fluid through the valve can be useful, for example, if the valve is used to control a process fluid that can reach a very high temperature and/or a very low temperature. In the embodiment of FIG. 4, for example, the pressurization fluid circulation system further includes a heater 406 that can be used to heat the pressurizing fluid, and thereby maintain the bellows 100 at a moderate temperature, even if the process fluid drops to a very low temperature. In extreme cases, heating and circulating 300 the pressurizing fluid can assist with freeze recovery of the valve if the process fluid solidifies due to extremely low temperatures. Similarly, the pressurizing fluid can be used as a cooling medium so as to moderate the temperature of the bellows 100 even if the process fluid reaches an extremely high temperature. Depending on the embodiment, the pressurizing fluid can simply be circulated at ambient temperature, or a chiller can be employed in place of the heater 406 of FIG. 4.

Figure 5:
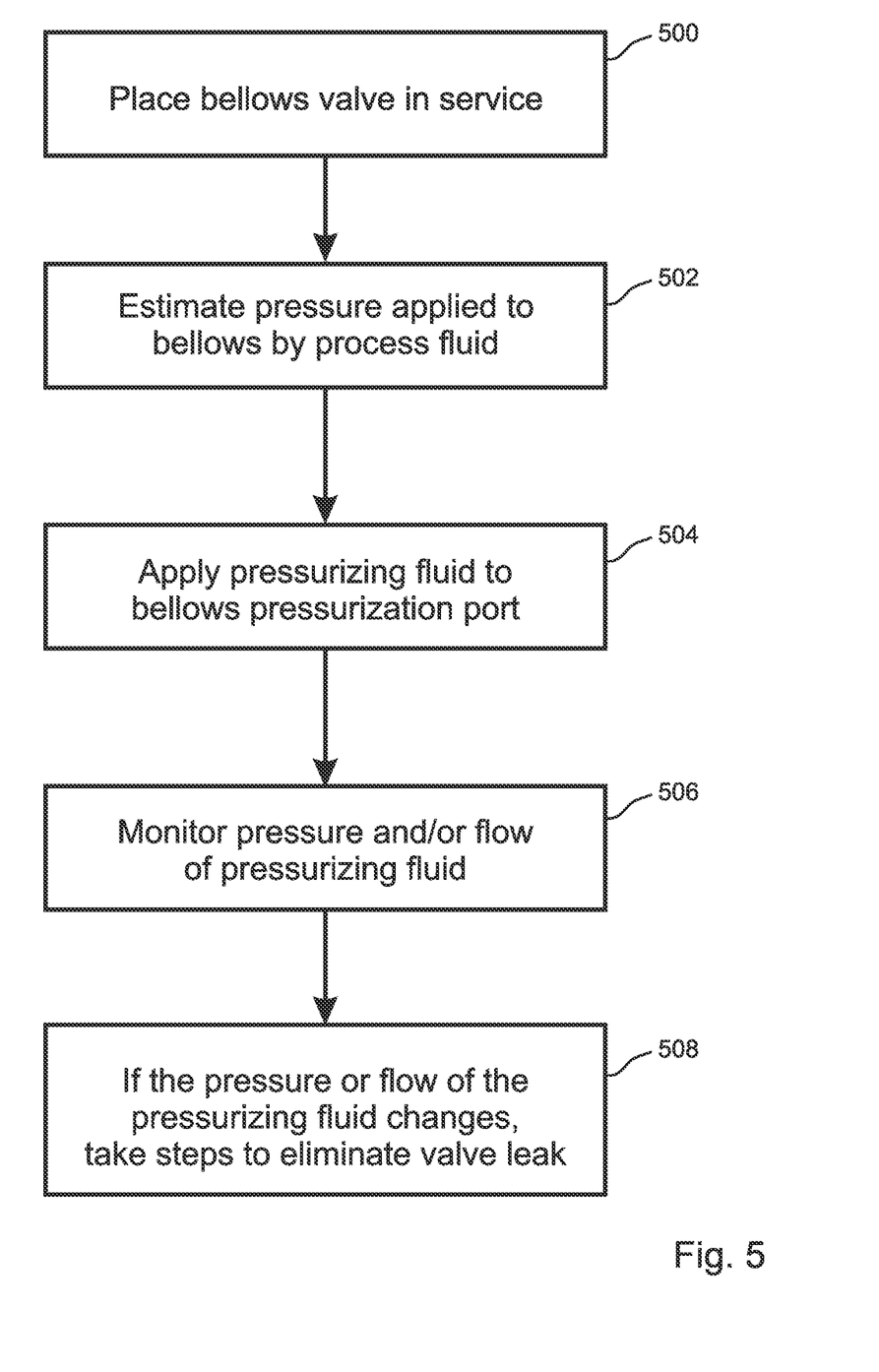
FIG. 5 is a flow diagram that illustrates a method embodiment of the present invention.

With reference to FIG. 5, an embodiment of the method of the present invention includes providing a bellows seal valve as described above and putting it into service 500 to control a flow of a process fluid. The method further includes estimating 502 the pressure of the process fluid as it is applied to the process fluid side of the bellows, and applying 504 a pressurizing fluid to the bellows pressurization port, preferably at a pressure that is slightly higher than the process fluid pressure. The method further comprises, as the bellows seal valve remains in service, monitoring 506 the pressure and/or flow rate of the pressurizing fluid so as to detect if there is any leakage through the bellows and/or past the packing. If a leak is detected due to the pressure or flow rate changing beyond a specified amount, the method further includes taking steps 508 to eliminate the leak, such as replacing the bellows seal valve or installing a new bellows into the bellows seal valve.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A bellows valve system comprising a bellows valve, the bellows valve comprising:
    a valve seat;
    a valve plug configured to control a flow of process fluid through the bellows valve according to a separation between the valve plug and the valve seat;
    a valve stem in mechanical communication with the valve plug and configured such that linear actuation of the valve stem controls the separation between the valve plug and the valve seat;
    a bellows housing surrounding a bellows portion of the valve stem;
    a bellows surrounding the bellows portion of the valve stem within the bellows housing, a proximal end of the bellows being fixed and sealed to the bellows housing, a distal end of the bellows being fixed and sealed to the valve stem, such that the bellows is compressed and extended as the valve stem is actuated, the bellows being configured such that the process fluid contacts a first surface of the bellows but is prevented by the bellows from reaching a second surface of the bellows;
    a bellows pressurization port configured to allow a bellows pressurizing fluid to enter into the bellows valve and to apply a compensating pressure to the second surface of the bellows; and
    a pressurization fluid source, a pressurizing fluid pressure regulating apparatus comprising a pump and a temperature regulator, and a pressurization fluid line that provides fluid communication between the pressurization fluid source and the bellows pressurization port of the bellows valve.

2. The bellows valve system of claim 1, wherein the first surface of the bellows is an exterior surface of the bellows, and the second surface of the bellows is an interior surface of the bellows.

3. The bellows valve system of claim 1, further comprising a pressure measuring device configured to measure a pressure of the pressurizing fluid as it enters the bellow valve.

4. The bellows valve system of claim 1, further comprising a flow measuring device configured to measure a flow rate of the pressurizing fluid as it enters the bellow valve.

5. The bellows valve system of claim 1, wherein the bellows valve further comprises a pressurizing fluid exit port configured so as to enable the pressuring fluid to be circulated from the bellows pressurization port to the pressurizing fluid exit port.

6. A method of increasing a cycle life of a bellows valve, the method comprising:
providing a bellows valve system according to claim 1;
estimating a process pressure applied by the process fluid to the first surface of the bellows valve; and
applying a pressurizing fluid to the pressurizing port, the pressurizing fluid being thereby applied to the second surface of the bellows, such that a differential pressure applied to the bellows is reduced.

7. The method of claim 6, wherein the pressurizing fluid is applied to the pressurizing port at a pressure that is higher than the estimated process pressure.

8. The method of claim 6, further comprising monitoring at least one of a pressure of the pressurizing fluid and a flow rate of the pressurizing fluid.

9. The method of claim 6, wherein if the monitored pressure or the monitored flow rate changes by more than a specified amount, the method further comprises determining that a leak has developed in the bellows valve, and taking an action that eliminates the leak.

10. The method of claim 6, wherein the bellows valve further comprises a pressurizing fluid exit port in fluid communication within the bellows valve with the bellows pressurization port.

11. The method of claim 10, wherein the method further comprises circulating the pressurizing fluid through the bellows valve from the bellows pressurization port to the pressurizing fluid exit port.

12. The method of claim 11, wherein the method further comprises heating or cooling the pressurizing fluid before it enters the pressurization port.

13. The method of claim 6, wherein the pressurizing fluid is nitrogen gas.

* * * * *